United States Patent [19]

Fan

[11] 4,202,808

[45] May 13, 1980

[54] VINYL RESIN LATEX COATING COMPOSITIONS

[75] Inventor: You-Ling Fan, East Brunswick, N.J.

[73] Assignee: Union Carbide Corporation, New York, N.Y.

[21] Appl. No.: 886,091

[22] Filed: Mar. 13, 1978

[51] Int. Cl.² ............................................ C08L 27/06
[52] U.S. Cl. .................... 260/29.6 WB; 260/29.6 E; 260/29.6 SQ; 260/29.6 PM; 260/29.6 RW
[58] Field of Search ............... 260/29.6 H, 29.6 E, 260/29.6 SQ, 29.6 PM, 29.6 WB, 29.6 RW, 29.6 TA

[56] References Cited

U.S. PATENT DOCUMENTS

| | | | |
|---|---|---|---|
| 3,389,109 | 6/1968 | Harmon | 260/29.6 H |
| 3,671,295 | 6/1972 | Ravve | 117/93.31 |
| 3,821,146 | 6/1974 | Drelich | 260/29.6 RW |
| 3,839,258 | 10/1974 | Visseren | 260/29.6 PM |
| 3,983,059 | 9/1976 | Sekmakas | 260/29.6 E |
| 4,076,677 | 2/1978 | Sekmakas | 260/29.6 TA |

*Primary Examiner*—Paul R. Michl
*Attorney, Agent, or Firm*—Bernard Francis Crowe

[57] ABSTRACT

Vinyl resins containing carboxyl or sulfonic acid functionalities can be formulated as stable, aqueous, colloidal dispersions suitable for preparing coatings by converting them to ionomers in a mixture of an organic solvent water-soluble organic polymer and water, followed by stripping off solvent.

21 Claims, No Drawings

VINYL RESIN LATEX COATING COMPOSITIONS

BACKGROUND OF THE INVENTION

This invention pertains to the preparation of stable aqueous microemulsions of carboxylic acid or sulfonic acid containing vinyl resins by converting said vinyl resins to ionomers in an aqueous mixture of solvent and water-soluble organic polymer.

Vinyl resin lacquers are old in the art and have enjoyed commercial success for coating various substrates with clear vinyl coatings. The coating operation however, involves the removal of large quantities of organic solvents in which the vinyl resins are dissolved. For ecological and anti-pollution considerations solvent based coatings are undesirable. This had led to consideration of water-borne resin systems for coating applications. It has not been found feasible to simply substitute a water-borne system for the vinyl resin lacquers for several reasons. While one may make vinyl resin latices by emulsion polymerization, these polymerization techniques require the presence of components in the polymerization recipe which have a deleterious effect on the final coating. The presence of organic solvent leveling aids in vinyl resin latices is also undesirable from an ecological view.

It is therefore an object of this invention to afford a water-borne vinyl resin which contains a minimum amount of extraneous additives.

These and other objects will become apparent upon reading the specification.

SUMMARY OF THE INVENTION

It has now been found that water-borne vinyl resin systems meeting the objects of this invention are provided by stable, aqueous, colloidal dispersions of vinyl resins prepared by vigorously blending vinyl resins having carboxylic or sulfonic acid groups therein with a base, water, at least one organic, water-miscible solvent which has an affinity for said resins and a boiling point below about 160° C., and an organic, water-miscible, macromolecular compound and then stripping off the solvent.

It is preferred to prepare these colloidal dispersions by blending:

(A) a normally solid vinyl resin containing carboxylic or sulfonic acid groups and having the following moieties copolymerized therein:

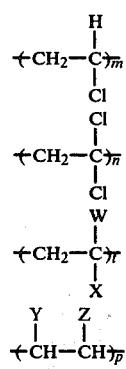

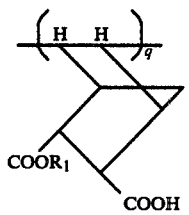

wherein m and n are percentages each having a value of 0–99%, t is a percentage having a value of 0–59%;

p is a percentage having a value of 1–30%;

when q=0 q is a percentage having a value of 1–30%;

when p=0 with the proviso that m+n+t is ≧70 and ≦99%, that m+n+t+p+q=100%, that when m=0, n is at least 1 and that when n=0, m is at least 1; wherein X is a monovalent radical selected from the group consisting of —H and lower alkyls having 1–4 carbons;

W is a monovalent radical selected from the group consisting of —H, lower alkyls, aryl having 6 to about 9 carbons,

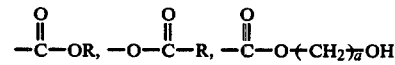

wherein a is an integer having values of 1–3,

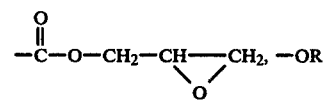

wherein R is a $C_1$–$C_{18}$ alkyl, H,

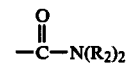

wherein $R_2$ is a monovalent radical selected from the group consisting of —H, methyl or ethyl, and —CN;

Y is a monovalent radical selected from the group consisting of —H, methyl,

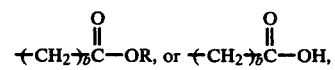

wherein b is an integer having values of 0–4, and

Z is a monovalent radical selected from the group consisting of

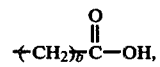

—$SO_3H$ and —$C_6H_4$—$SO_3H$, with the proviso that Y and Z are never —COOH and —$SO_3H$ at the same time, and $R_1$ is a $C_1$–$C_4$ alkyl or H;

(B) sufficient water-miscible base to neutralize about 10% to 100% of said carboxylic or sulfonic acid groups, (C) 1 to about 1000 parts, per 100 parts by weight of vinyl resin (A), of a water-miscible normally liquid solvent for said vinyl resin having a boiling point of up to 160° C., selected from the group consisting of lower aliphatic ketones, esters or ethers having 3 to about 6 carbon atoms and cycloaliphatic ketones or ethers having 4 to about 6 carbon atoms;

(D) a water-miscible, normally solid macromolecular organic compound selected from the group consisting of cellulose ethers, poly(alkylene oxides), homopolymers of vinyl alcohol, acrylic acid, methacrylic acid, vinyl pyrrolidone or acrylamide and copolymers of vinyl alcohol, acrylic acid, methacrylic acid, vinyl pyrrolidone, maleic acid or acrylamide containing at least one of the following lipophilic moieties copolymerized therein:

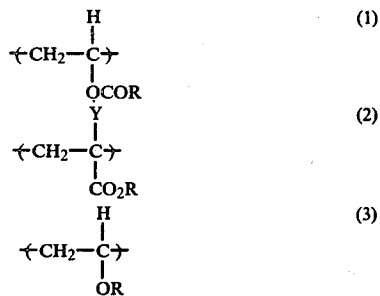

wherein Y and R are as indicated above; and (E) sufficient water to provide an aqueous colloidal dispersion having a total solids content of up to about 60% by weight; and then stripping the mixture until substantially free of organic solvent.

The vinyl resins useful in this invention in their broadest sense are copolymers of vinyl chloride, vinylidene chloride or both copolymerized with a vinyl comonomer containing at least one carboxylic acid group, —COOH or sulfonic acid group, —SO$_3$H, Exemplary resins include copolymers of vinyl chloride and acrylic or methacrylic acid, vinyl chloride and maleic acid, vinyl chloride and styrene sulfonic acid and the like; copolymers of vinylidene chloride and acrylic or methacrylic acid, vinylidene chloride and maleic acid, vinylidene chloride and styrene sulfonic acid, and the like.

These vinyl resins also encompass three component copolymers containing for example the following monomers copolymerized therein:
vinyl chloride/vinyl acetate/acrylic acid
vinyl chloride/vinyl acetate/maleic acid
vinyl chloride/vinyl acetate/crotonic acid
vinyl chloride/vinyl acetate/5-norbornene-2,3-dicarboxylic acid, monobutyl ester
vinyl chloride/vinyl acetate/fumaric acid
vinyl chloride/methyl methacrylate/maleic acid
vinyl chloride/acrylonitrile/maleic acid
vinyl chloride/styrene/maleic acid
vinyl chloride/vinyl stearate/maleic acid
vinyl chloride/2-propenyl acetate/maleic acid
vinyl chloride/hydroxypropylacrylate/maleic acid
vinyl chloride/glycidyl methacrylate/maleic acid
vinyl chloride/acrylamide/maleic acid
vinyl chloride/vinyl alcohol/maleic acid
vinyl chloride/vinyl butyl ether/maleic acid
vinyl chloride/ethyl acrylate/maleic acid
vinyl chloride/ethylene/maleic acid
vinyl chloride/ethylene/acrylic acid
vinyl chloride/propylene/maleic acid
vinyl chloride/styrene/acrylic acid
vinyl chloride/vinyl acetate/styrene sulfonic acid
vinyl chloride/vinyl acetate/vinyl sulfonic acid, and the like as well as other terpolymers in which vinylidene chloride is substituted for vinyl chloride in this list.

In addition four component quadripolymers can also be used wherein both vinyl chloride and vinylidene chloride are copolymerized with the other comonomers shown in the terpolymers in the preceding paragraph.

The amount of each monomer copolymerized in the vinyl resins is not narrowly critical.

The ethylenically unsaturated carboxylic acids enumerated above as well as the other comonomers are commercially available. The more common sulfonic acid containing monomers are also commercially available or can be synthesized by sulfonation of ethylenically unsaturated monomers ranging from aliphatic monomers, such as, ethylene to aromatic monomers, such as, styrene, with known sulfonation agents, such as, listed in "Unit Processes in Organic Synthesis" by P. H. Groggins, McGraw-Hill Co., Inc., page 262 NYC (1947).

The invention is not limited to single copolymers and so various combinations of two or more of these vinyl resins can be emulsified as well.

Preferred vinyl chloride resins include vinyl chloride terpolymers having about 60 to about 91 weight % vinyl chloride, about 10 to about 25 weight % vinyl acetate and about 1 to about 15 weight % of maleic acid, fumaric acid or crotonic acid copolymerized therein. Such terpolymers may be obtained commercially or may be synthesized by a free radical initiated polymerization of vinyl chloride, vinyl acetate and maleic acid, or maleic anhydride, fumaric acid or crotonic acid.

The above-described vinyl chloride resins can also be blended with vinyl chloride/vinyl acetate terpolymers containing glycidyl or hydroxyalkyl acrylates or methacrylates having 2 or 3 carbons in the alkyl group to afford crosslinked coatings. One can also add thermosetting resins, such as, epoxy resins urea resins and melamine resins to obtain a higher degree of crosslinking. Preferred epoxy resins include liquid and solid diglycidyl ethers of bisphenol A which are commercially available and described in "Epoxy Resins" by H. Lee and K. Neville, McGraw-Hill and Co., Inc. NYC 1957, incorporated herein by reference.

Preferred melamine resins are the hexamethoxymethylmelamine resins. Preferred urea resins are the methylated urea-formaldehyde resins. These are commercially available.

Exemplary cellulose ethers include methyl cellulose, hydroxyethylmethyl cellulose, hydroxypropylmethyl cellulose, hydroxyethyl cellulose, sodium carboxymethyl cellulose, and the like.

Exemplary water-miscible copolymers containing lipophilic moieties include: partially hydrolyzed polyvinyl esters where the ester group contains 1 to about 4 carbons, such as, polyvinyl formate, polyvinyl acetate, polyvinyl propionate, and the like; copolymers of vinyl esters having 1 to about 4 carbons and acrylic, methacrylic or maleic acid, such as, vinyl acetate/acrylic acid copolymers, vinyl acetate/methacrylic acid copolymers, vinyl acetate/maleic acid copolymers, and the like; copolymers of alkyl acrylates or methacrylates containing 1 to about 18 carbons in the alkyl group and vinyl alcohol, vinyl pyrrolidone, acrylamide, acrylic, methacrylic or maleic acid, such as, methyl acrylate/acrylic acid copolymers, ethyl acrylate/methacrylic acid copolymers, butyl methacrylate/maleic acid copolymers, ethyl acrylate/vinyl pyrrolidone copolymers, methyl methacrylate/acrylamide copolymers, and the like; copolymers of alkyl vinyl ethers containing 1 to 18 carbons and vinyl alcohol, acrylic acid methacrylic acid, maleic acid, vinyl pyrrolidone or acrylamide, such as, methyl vinyl ether/vinyl alcohol copolymers, ethyl vinyl ether/vinyl alcohol copolymers, isobutyl vinyl ether/vinyl alcohol copolymers, ethyl vinyl ether/acrylic acid copolymers, isopropyl vinyl ether/methacrylic copolymers, ethyl vinyl ether/maleic acid copolymers, butyl vinyl ether/acrylamide copolymers, propyl vinyl ether/vinyl pyrrolidone copolymers, and the like.

The preferred water-miscible vinyl resins are polyvinyl alcohols such as the 70–100% hydrolyzed polyvinyl acetates or hydrolyzed polyvinyl alkyl ethers.

Exemplary polyalkylene oxides include polyethylene oxides, polypropylene oxides, polybutylene oxides, and mixtures thereof derived by the oxyalkylation of active hydrogen sites in starters such as water, alcohols, glycols and the like, with ethylene oxide, 1,2-propylene oxide or 1,2-butylene-oxide. These are commercially available in varying degrees of polymerization. Polyalkylene oxides having a degree of polymerization of about 5 to about 10,000 are preferred, although any range where the resultant polymers are water-miscible can be used.

Blush or whitening of the coatings is determined subjectively, a test well known to those skilled in the art.

Cross-hatch adhesive failure determinations are made scratching a cross on the coated substrates with a sharp pointed instrument, pressing sections of Scotch tape across the scratched portions and then ripping the Scotch tape away from the coated surface. Failures are indicated by the amount of coating which pulls away from the substrate.

It is a unique feature of the microemulsions described herein that very thin continuous protective films can be laid on both metallic and non-metallic substrates. Upon baking the resultant films are pin-hole free, blush resistant and adhere tenaciously to the substrates. It is unexpected that these film properties are provided without the necessity of utilizing leveling aids or plasticizers.

Other additives known to those skilled in the art can also be incorporated into the microemulsions if desired. These include dyes, pigments, fillers, antioxidants, ultraviolet stabilizers, heat stabilizers, plasticizers and the like.

For the purposes of this invention the term "water-miscible base" is used in the broad sense of any proton acceptor which will neutralize the acid functionalities in the vinyl resin, i.e., —COOH or SO$_3$H groups and whose solubility is at least about 1 g. per 100 cc of water. Exemplary bases which may be organic or inorganic, include alkali metal or alkaline earth hydroxides, such as, sodium hydroxide, potassium hydroxide, lithium hydroxide, magnesium hydroxide, calcium hydroxide, strontium hydroxide, barium hydroxide, and the like; and ammonium hydroxide; organic amines including monoalkylamines, alkenediamines, alkanolamines, aromatic amines, cyclic amines, alkaryl amines, and the like. For economic reasons and ready availability alkali metal, alkaline earth and ammonium hydroxides are preferred inorganic bases. In coating application it is preferred to use volatile bases which are fugitive and consequently reversible ionomers are formed. For example, ammonium hydroxide or lower molecular weight alkylamines form ionomers which afford coatings wherein the ionomer moieties revert to acid and from which the base, being fugitive, is removed. This enhances blush resistance and minimize color formation upon exposure of the final coating to the elements. Particularly preferred alkylamines include monomethyl amine, dimethyl amine, trimethyl amine, triethyl amine, and the like.

In general, preferred alkyl amines have the formula:

$$R_a-N-R_c$$
$$|$$
$$R_b$$

wherein each of $R_a$, $R_b$ and $R_c$ is H or a $C_1$–$C_6$ alkyl with the proviso that $R_a+R_b+R_c \leq 6$ carbons.

Preferred alkylene diamines have the formula:

$$H_2N(D)_xNH_2$$

where $x=1-8$ and D is alkylene radical.

Preferred alkanolamines include mono-, di-, and tri-ethanolamine, N-methyl ethanolamine, N,N-dimethylethanolamine, N,N-diethyl ethanolamine, N-aminoethylethanolamine, N-methyl diethanolamine, and the like.

Preferred cyclic amines include morpholine, N-methyl morpholine, piperidine, pyrrolidine, piperazine, N-methyl piperazine, N-(2-hydroxyethyl)piperazine, N-aminoethyl piperazine, 2,5-dimethyl piperazine, hexamethylene tetramine, and the like.

Although about 1 to about 1000 parts of water-miscible normally liquid solvent can be used, it is preferred to use about 100 to about 300 parts of the solvents listed below per 100 parts of vinyl resin (A) by weight.

Preferred lower aliphatic ketone solvents include acetone, methyl ethyl ketone (MEK), diethyl ketone, methyl n-propyl ketone, methyl isopropyl ketone, acetyl acetone, 1-methoxy-2-propanone, and the like.

Preferred lower aliphatic ester solvents include methyl formate, ethyl formate, methyl acetate, ethyl acetate, isopropyl acetate, and the like.

Preferred lower aliphatic ether solvents include diethyl ether, ethyl propyl ether, di-n-propyl ether, and the like.

Preferred cycloaliphatic ketones solvents include cyclobutanone, cyclopentanone, cyclohexanone, and the like.

Preferred cycloaliphatic ether solvents include, dioxane, tetrahydrofurane, and the like.

Depending on the particular vinyl resin used, it may be preferable to use mixtures of these solvents rather than a single solvent. For example, with a vinyl chloride/vinyl acetate/maleic acid terpolymer the combination of acetone with another ketone, such as, methyl ethyl ketone will afford colloidal dispersions superior to those formulated with acetone alone.

The order of addition of the components used to prepare these colloidal dispersions is not critical. Thus for example one may first make a varnish of the vinyl resins with the solvent, followed by conversion to an ionomer with base and then emulsification with water. The water can be added to the varnish or vice versa. One may also make these colloidal dispersions from dry vinyl resin rather than a varnish thereof, by adding pulverized resin pellets to a mixture of solvent, base and water.

The degree of neutralization of the acid moieties in the vinyl resin components can as pointed out above vary over a wide range, i.e., from about 10% to about 100%. The optimum degree of neutralization depends upon the amount of acid moiety in the vinyl resin. Thus for example a vinyl resin containing a low amount of acid moiety, e.g., 2 or 3 weight % should be neutralized with base to a much greater extent than a vinyl resin containing a large amount of acid moieties. This is believed to be due to the higher polarity of the higher acid moiety containing vinyl resins.

No special equipment is needed to effect emulsification other than high shear agitation or mixing equipment known to those skilled in the art.

The invention is further described in the Examples which follow. All parts and percentages are by weight unless otherwise specified.

EXAMPLE 1—Preparation of Ammonium Colloidal Dispersion

To a varnish composed of 60 grams Bakelite VMCA vinyl resin (a terpolymer containing 81% vinyl chloride, 17% vinyl acetate and 2% maleic acid copolymerized therein), 30 grams of Bakelite VERR vinyl resin (a terpolymer containing 80% vinyl chloride, 11% vinyl acetate, and 9% glycidyl methacrylate copolymerized therein, having a number average molecular weight of about e.g. 8400), and 137 grams of methyl ethyl ketone, was added vigorous stirring and an aqueous solution containing 290 grams of water, 8 grams of Elvanol-51-05G (trademark of E. I. duPont Company for 86% hydrolyzed polyvinyl acetate), 4 grams of Cymel-301 melamine resin (trademark of American Cyanamide Company for hexamethoxymethyl melamine) and 3 grams of ammonium hydroxide (58% by weight in water). A uniform, milky emulsion was obtained. The emulsion was concentrated under vacuum at 46° C. to remove the methyl ethyl ketone. A colloidal dispersion was obtained which had the following composition:

| | |
|---|---|
| VMCA Vinyl Resin | 24.14 |
| VERR Vinyl Resin | 12.07 |
| Poly (vinyl alcohol) Elvanol-51-05G | 3.2 |
| Melamine Cymel 301 | 1.6 |
| Ammonium hydroxide (approximately) | 1.0 |
| Water | 58.0 |
| TOTAL | 100% by weight |

Examination of the above colloidal dispersion by gas chromatography showed no detectable methyl ethyl ketone in the system.

The colloidal dispersion prepared above was applied on some typical metallic substrates used for the manufacture of 2-piece cans. Coatings were obtained by baking under the conditions delineated in Table 1 below. In all instances, a clear, coherent and glossy film was obtained. Results of pasteurization tests were shown in Table 1 also.

| SUBSTRATE | BAKING CYCLE C.° | MIN. | BLUSH | CROSS-HATCH ADHESION FAILURE |
|---|---|---|---|---|
| Electrically coated tin Plate (ETP) | 170 | 4 | NONE | 0% |
| | 196 | 2 | " | " |
| Aluminum | 170 | 4 | " | " |
| A-376[a] | 196 | 2 | " | " |
| Aluminum | 170 | 4 | " | " |
| A-276[b] | 196 | 2 | " | " |

[a]Alcoa 5182 aluminum-magnesium alloy cleaned only.
[b]Alcoa 5182 aluminum-magnesium alloy cleaned and conversion coated with a phosphate/chromate bath.

The colloidal dispersion prepared above was also coated with a drawdown rod on an aluminum A-272 panel (Alcoa 5182 aluminum-magnesium alloy sold by the Aluminum Company of America whose surface was converted to an amorphous coating, such as, phosphate/chromate, or the like). Upon baking at 340° F. (172° C.) for 4 minutes, a coherent, clear and glossy coating was obtained on the panel. The baked coating exhibited excellent resistance in the acetone rub test. The acetone rub test is carried out by hand rubbing a baked coated panel with an acetone-soaked cheese cloth and press or fail by the operator.

A small sample of the colloidal dispersion prepared above was sealed in a pyrex glass ampoule and heated in a constant temperature about 77° C. for a period of 30 minutes. The colloidal dispersion remained stable with no visible signs of flocculation or settling of resin observed.

EXAMPLE 2—Preparation of Ammonium Colloidal Dispersion

Example 1 was repeated with the exception that the 137 grams of methyl ethyl ketone was replaced with a mixture consisting of 65.3 grams each of methyl ethyl keone and acetone. A uniform, milky microemulsion was obtained. The above microemulsion was stripped at 46° C. under vacuum to yield a colloidal dispersion containing 40.6% total solids. Gas chromatographic analysis showed no detectable amount of either methyl ethyl ketone or acetone. The colloidal dispersion had a Brookfield viscosity of 233.6 centipoise at 28° C.

The colloidal dispersion prepared in Example 2 was coated on an A-272 aluminum panel with a drawdown rod. The coating was subsequently baked at 335° F. (168° C.) for 4 minutes. A coherent, clear and glossy coating, similar to the one described in Example 1 was obtained.

EXAMPLE 3—Preparation of Ammonium Colloidal Dispersion

Example 1 was repeated with the exception that the aqueous solution contained 290 grams of water, 12 grams of Gelvatol-40-20 (75% hydrolyzed polyvinyl acetate supplied by Monsanto), 6 grams of Cymel-301 melamine resin and 3 grams of 58% ammonium hydroxide solution. A uniform, milky microemulsion was obtained.

This microemulsion was then stripped at 46° C. under vacuum to yield a colloidal dispersion having the following composition:

| | |
|---|---|
| VMCA Vinyl Resin | 23.73 |
| VERR Vinyl Resin | 11.87 |
| Gelvatol-40/20 | 4.74 |
| Cymel-301 | 2.37 |
| Ammonium Hydroxide | 1.0 |

| -continued | |
|---|---|
| (approximate) | |
| Water | 56.29 |
| TOTAL | 100% by weight |

EXAMPLE 4—Preparation of Ammonium Colloidal Dispersion

Example 1 was repeated with the exception that the 8 grams of Elvanol-51-05G was replaced with an equal amount of Gelvatol-20/30. A uniform, milky emulsion was obtained. After stripping at 46° C. under vacuum, a colloidal dispersion having the following compositions was obtained:

| VMCA Vinyl Resin | 24.0 |
|---|---|
| VERR Vinyl Resin | 12.0 |
| Poly(vinyl alcohol) | } 3.2 |
| Gelvatol-20/30 | |
| Cymel-301 | 1.6 |
| Ammonium Hydroxide (approximate) | 1.0 |
| Water | 58.2 |
| TOTAL | 100% by weight |

EXAMPLE 5—Preparation of Ammonium Colloidal Dispersion

Example 3 was repeated with the exception that the 4 grams of Cymel-301 melamine resin was replaced with an equal amount of urea Beetle-60. A uniform, milky microemulsion was obtained. This emulsion was concentrated under vacuum to yield a colloidal dispersion with the following composition:

| VMCA Vinyl Resin | 24.0 |
|---|---|
| VERR Vinyl Resin | 12.0 |
| Poly(vinyl alcohol) | } 3.2 |
| Gelvatol-20/30 | |
| Urea Beetle-60 | 1.6 |
| Ammonium Hydroxide (approximate) | 1.0 |
| Water | 58.2 |
| TOTAL | 100% by weight |

The colloidal dispersion had a Brookfield viscosity of 937.6 cps at 27° C.

EXAMPLE 6—Preparation of Ammonium Colloidal Dispersion

Example 4 was repeated with the exception that the 60 grams of VMCA vinyl resin was replaced with an equal amount of Bakelite VMCC vinyl resin (Trademark of Union Carbide Corporation for a terpolymer containing 83% vinyl chloride, 16% vinyl acetate, and 1% maleic acid copolymerized therein having an number average molecular weight of 14,800) and the quantity of Gelvatol-20/30 was increased from 8 grams to 9 grams. A uniform, milky microemulsion was obtained which was then concentrated at 47° C. under vacuum to yield a colloidal dispersion having the following composition:

| VMCC Vinyl Resin | 24.0 |
|---|---|
| VERR Vinyl Resin | 12.0 |
| Poly(vinyl alcohol) | } 3.6 |
| Gelvatol-20/30 | |
| Urea Beetle-60 | 1.6 |
| Ammonium Hydroxide (approximate) | 1.0 |
| Water | 57.8 |
| TOTAL | 100% by weight |

This colloidal dispersion had a Brookfield viscosity of 1,536 cps at 27° C.

EXAMPLE 7—Preparation of Ammonium Colloidal Dispersion

The procedure described in Example 1 was repeated with the exception that the 137 grams of methyl ethyl ketone was replaced with an equal amount of tetrahydrofuran. After vacuum stripping, a uniform colloidal dispersion was obtained.

EXAMPLE 8—Preparation of Ammonium Colloidal Dispersion with N-Butanol

The procedure described in Example 1 was repeated with the exception that one-third of the 137 grams of methyl ethyl ketone was replaced with n-butanol. After vacuum stripping, a uniform colloidal dispersion was obtained.

EXAMPLE 9—Preparation of Ammonium Colloidal Dispersion

To a varnish composed of 90 grams Bakelite VMCC vinyl resin and 137 grams of methyl ethyl ketone was added with vigorous stirring an aqueous solution containing 6 grams of Gelvatol-20/90 (86% hydrolyzed polyvinyl acetate), 244 grams of water and 3 grams of ammonium hydroxide (58% aqueous solution). A uniform, milky emulsion was obtained. This emulsion was stripped under vacuum at 45° C. to remove the methyl ethyl ketone. The finished colloidal dispersion contained 30% total solids and had a Brookfield viscosity of 86 cps at 26° C.

EXAMPLE 10—Preparation of Ammonium Colloidal Dispersion

The procedure described in Example 1 was repeated with the exception that the 8 grams of Elvanol-51-05G was replaced with an equal amount of Gelvatol-40/10. A uniform, milky emulsion was obtained. After vacuum stripping, a colloidal dispersion was obtained which contained 41% total solids and had a Brookfield viscosity of 103 cps at 29° C.

The colloidal dispersions described in Examples 3–9 can be used to make clear, coherent and glossy film on metallic substrates such as those used for the manufacture of cans.

Although the invention has been described in its preferred forms with a certain degree of particularity, it is understood that the present disclosure has been made only by way of example, and that numerous changes can be made without departing from the spirit and scope of the invention.

What is claimed is:

1. Method of preparing water-borne colloidal dispersions of vinyl resins selected from the group consisting of vinyl chloride, vinylidene chloride or vinyl chloride/vinylidene chloride copolymers having carboxylic or sulfonic acid groups therein which comprises vigorously blending said resins with a water-miscible base, water, and at least 1 organic water-miscible solvent which has an affinity for said resins and a boiling point below about 160° C. and an organic water-miscible macromolecular compound selected from the group consisting of normally solid cellulose ethers, poly (alkylene oxides), homopolymers of vinyl alcohol, acrylic acid, methacrylic acid, vinyl pyrrolidone, maleic acid and acrylamide and copolymers of vinyl alcohol, acrylic acid, methacrylic acid, vinyl pyrrolidone, maleic acid and acrylamide containing at least one of the following lipophilic moieties copolymerized therein:

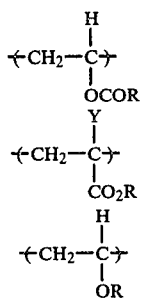 (1)

(2)

(3)

wherein Y is a monovalent radical selected from the group consisting of —H, methyl,

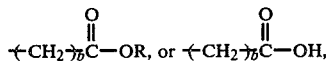

wherein b is an integer having values of 0–4 and R is a $C_1$–$C_{18}$ alkyl, and then stripping off said organic solvent.

2. Method of preparing water-borne stable colloidal dispersions of vinyl resins which comprises blending.

(A) A normally solid vinyl resin containing carboxylic or sulfonic acid groups and having the following moieties copolymerized therein:

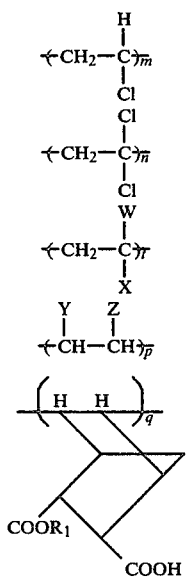

(1)

(2)

(3)

(4)

(5)

wherein m and n are percentages each having a value of 0–99%.

t is a percentage having a value of 0–59%;

p is a percentage having a value of 1–30%;

when q=0 q is a percentage having a value of 1–30%; when p=0 with the proviso that m+n+t is ≧70 and ≦99%, that m+n+t+p+q=100%, that when m=0, n is at least 1 and that when n=0, m is at least 1;

wherein X is a monovalent radical selected from the group consisting of —H and lower alkyls having 1–4 carbons;

W is a monovalent radical selected from the group consisting of —H, lower alkyls, aryl having 6 to about 9 carbons,

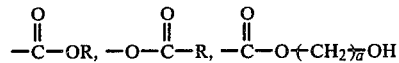

wherein a is an integer having values of 1–3;

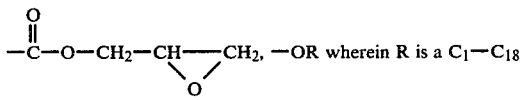

alyl, H,

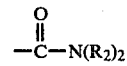

wherein $R_2$ is a monovalent radical selected from the group consisting of —H, methyl or ethyl, and —CN;

$R_1$ is a $C_1$–$C_4$ alkyl or H;

Y is a monovalent radical selected from the group consisting of —H, methyl,

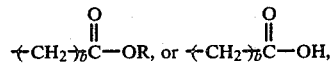

wherein b is an integer having values of 0–4; and

Z is a monovalent radical selected from the group consisting of

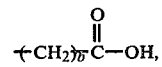

—SO$_3$H and —C$_6$H$_4$—SO$_3$H, with the proviso that Y and Z are never —COOH and —SO$_3$H at the same time;

(B) sufficient water-miscible base to neutralize about 10% to 100% of said carboxylic or sulfonic acid groups;

(C) 1 to about 1000 parts, per 100 parts by weight of vinyl resin (A), of a water-miscible normally liquid solvent for said vinyl resin having a boiling point of up to 160° C., selected from the group consisting of lower aliphatic ketones, esters or ethers having 3 to about 6 carbon atoms and cycloaliphatic ketones or ethers having 4 to about 6 carbon atoms;

(D) a water-miscible, normally solid macromolecular organic compound selected from the group consisting of cellulose ethers, poly(alkylene oxides), homopolymers of vinyl alcohol, acrylic acid, methacrylic acid, vinyl pyrrolidone or acrylamide and copolymers of vinyl alcohol, acrylic acid, methacrylic acid, vinyl pyrrolidone, maleic acid and acrylamide containing at least one of the following lipophilic moieties copolymerized therein:

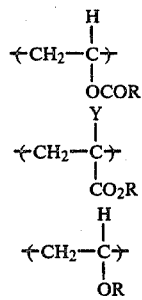

wherein Y and R are as indicated above; and (E) sufficient water to provide an aqueous, colloidal dispersion having a total solids content of up to about 60% by weight; and then stripping the mixture until substantially free of organic solvent.

3. Method claimed in claim 2 wherein the vinyl resin in (A) contains about 60 to about 91 weight % vinyl chloride, about 10 to about 25 weight % vinyl acetate and about 1 to about 15% carboxyl-containing ethylenically unsaturated hydrocarbon containing about 2 to about 10 carbon atoms in the hydrocarbon moiety.

4. Method claimed in claim 3 wherein the carboxyl-containing ethylenically unsaturated hydrocarbon is maleic acid or fumaric acid.

5. Method claimed in claim 3 wherein the vinyl resin in (A) contains about 75 to about 99 weight % vinyl chloride and about 1 to about 25% acrylic or methacrylic acid copolymerized therein.

6. Method claimed in claim 2 wherein a mixture of vinyl chloride/vinyl acetate/maleic acid terpolymer and a vinyl chloride/vinyl acetate/glycidyl acrylate or methacrylate terpolymer is used as the vinyl resin in (A).

7. Method claimed in claim 2 wherein a mixture of a vinyl chloride/vinyl acetate/maleic acid terpolymer and a vinyl chloride/vinyl acetate/hydroxyalkyl acrylate or methacrylate having 2 to 3 carbons in the alkyl group is used as the vinyl resin in (A).

8. Method claimed in claim 2 wherein the vinyl resin in (A) is a terpolymer of vinyl chloride, vinylidene chloride and an ethylenically unsaturated carboxylic acid.

9. Method claimed in claim 8 wherein the ethylenically unsaturated carboxylic acid is maleic acid or fumaric.

10. Method claimed in claim 8 wherein the ethylenically unsaturated carboxylic acid is acrylic or methacrylic acid.

11. Method claimed in claim 2 wherein the vinyl resin in (A) is a copolymer of vinyl chloride and an ethylenically unsaturated carboxylic acid.

12. Method claimed in claim 2 wherein the ethylenically unsaturated carboxylic acid is acrylic or methacrylic acid.

13. Method claimed in claim 2 wherein the vinyl resin in (A) is a copolymer of vinylidene chloride and an ethylenically unsaturated carboxylic acid.

14. Method claimed in claim 2 wherein a cross-linking amount of a thermosetting resin is blended into the dispersion.

15. Method claimed in claim 14 wherein the thermosetting resin is an epoxy resin.

16. Method claimed in claim 14 wherein the thermosetting resin is an hexamethoxymethylmelamine.

17. Method claimed in claim 14 wherein the thermosetting resin is a methylated urea-formaldehyde resin.

18. Method claimed in claim 2 wherein the macromolecular compound is polyvinyl alcohol.

19. Method claimed in claim 2 wherein the macromolecular compound is a copolymer having a lipophilic moiety copolymerized therein.

20. Method claimed in claim 19 wherein the copolymer is hydrolyzed polyvinyl acetate.

21. Method claimed in claim 19 wherein the copolymer is hydrolyzed polyvinyl ether.